Dec. 26, 1939.  S. E. BOUCHARD  2,184,408
EYEGLASS CASE
Filed Feb. 24, 1938

SAMUEL E. BOUCHARD
INVENTOR.

BY

ATTORNEYS

Patented Dec. 26, 1939

2,184,408

UNITED STATES PATENT OFFICE 2,184,408

EYEGLASS CASE

Samuel E. Bouchard, Rochester, N. Y., assignor to Bausch & Lomb Optical Company, Rochester, N. Y., a corporation of New York Application February 24, 1938, Serial No. 192,264

4 Claims. (Cl. 206—6)

The present invention relates to eyeglass cases and more particularly to eyeglass cases having bracing means to position the eyeglasses and strengthen the case against crushing.

One of the objects of the present invention is to provide an improved eyeglass case which is rigid, strong and durable and which adequately protects the eyeglasses. Another object is to provide an eyeglass case having a projection for positioning the eyeglasses and at the same time bracing the case against crushing. A further object is to provide such a case which is simple in construction and convenient in operation. These and other objects and advantages reside in certain novel features of construction, arrangement and combination of parts as will hereinafter be more fully set forth and pointed out in the appended claims.

Referring to the drawing.

Figure 1:
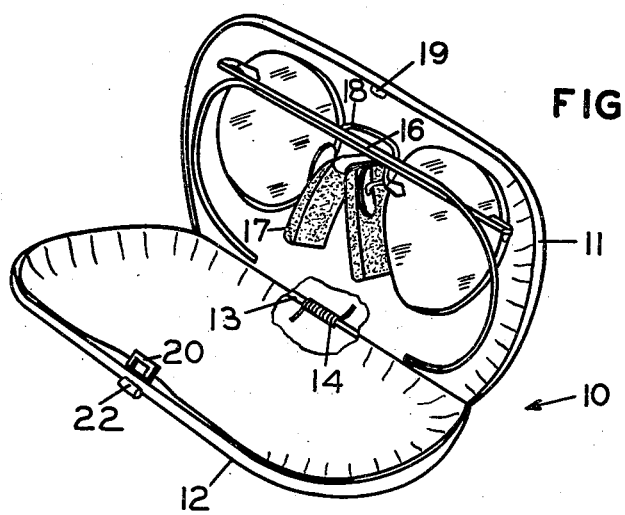
Fig. 1 is a perspective view of an eyeglass case embodying the present invention.

A preferred embodiment of the present invention is illustrated in the drawing wherein 10 designates, generally, an eyeglass case comprising a base 11 and a cover 12 hinged together along one edge as indicated at 13. A spring 14 adjacent the hinge 13 urges the cover 12 and base 11 into open position.

A bracket 15 formed of a flat metal strip is suitably secured at the front of the base 11 by welding or soldering, for example, and is provided at its rear end with an upstanding open loop portion 16. A flat metallic strip 17 is secured in the loop 16 so that it is substantially perpendicular to the base 11. As shown in Fig. 1, the flat strip 17 is covered with suitable material such as plush, velvet or the like, and is bent to form a positioning rest for the bridge or nose pads of the spectacles 18. The two ends of the strip 17 are freely bendable so that eyeglasses having bridges or nose pads of different width will fit snugly against the strip 17.

Figure 2:
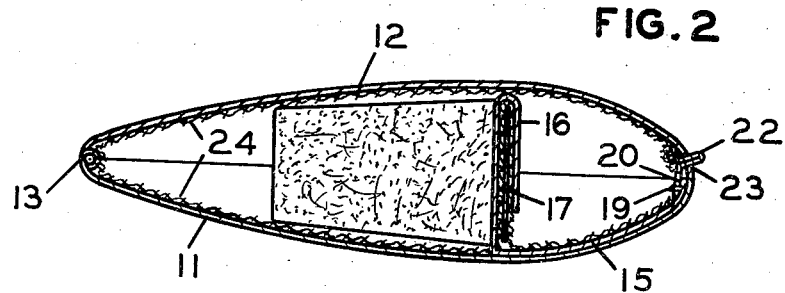
Fig. 2 is a vertical section thereof.
Figure 3:
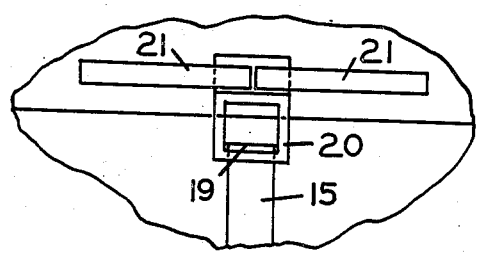
Fig. 3 is a fragmentary detail view showing the latch structure.

The front end of the bracket 15 is bent adjacent the front edge of the base 11 to form a detent 19. A latch 20 is resiliently secured to the cover 12, as for example by resilient strips 21, and a release 22 extends through a slot 23 in the cover 12 so that it is readily accessible as indicated in Fig. 2. The inside of both the base 11 and cover 12 are lined with a suitable material 24, such as plush, velvet or the like.

As shown in Fig. 2, the bendable strip 17 is of such width that, when the case is closed, both the base 11 and cover 12 engage its edge. The strip 17 thus serves a dual function in that it positions the eyeglasses against endwise movement in the case and at the same time serves to reinforce both the base 11 and cover 12 against crushing. This reinforcement not only protects the eyeglasses but permits the safe use of thinner and lighter material in the construction of the case.

From the foregoing, it will be apparent that I am able to attain the objects of my invention and provide a new and improved spectacle case which is simple and efficient in construction, operation, yet strong and durable in use. Various modifications can, of course, be made without departing from the spirit of my invention or the scope of the appended claims.

I claim:

1. An eyeglass case comprising two cover members hingedly secured together along one edge, spring means urging said members into open position, a bracket secured to one of said members, a detent portion on said bracket adjacent the edge removed from the hinged edge, a latch on the other of said members for selective engagement with said detent portion, an upstanding portion on said bracket, and a flat strip of bendable material secured to the upstanding portion of said bracket perpendicular to said one of said members, the other of said members engaging the edge of said strip when in closed position and being supported thereby.

2. An eyeglass case comprising two similar members hingedly secured together along one edge, spring means tending to move said members into open position, a metal strip secured to one of said members and terminating in a detent at the edge removed from the hinged edge, a movable latch on the other member for selective engagement with said detent, and a positioning element secured to said metal strip for engaging a pair of eyeglasses between the lenses to position the eyeglasses in the case, said positioning element engaging the said other member and acting as a support therefor when said members are in closed position.

3. An eyeglass case comprising two substantially coextensive, concavo-convex cover members hingedly secured together along one edge with their concave surfaces facing each other, a bracket secured on the concave surface of one of said members and projecting upwardly therefrom toward the other member, a sheet of stiff, bendable material secured at substantially its middle to said bracket so that one edge rests on the concave surface of said one of said members, the free ends of said sheet being bent toward each other to form a stop for engagement by the nose pads of a pair of eyeglasses, said other member when in closed position resting on the other edge of said sheet and being supported thereby.

4. An eyeglass case comprising two cover members hingedly secured together along one edge, a bracket secured to one of said members and having an upwardly projecting portion, and a sheet of stiff bendable material secured at substantially its middle to the upwardly projecting portion of said bracket so that the bottom edge of said sheet rests on said one of said members, the free ends of said sheet being bent toward each other to form stops for engagement by the nosepads of a pair of eyeglasses, the other of said members, when in closed position, engaging the top edge of said sheet and being supported thereby.

SAMUEL E. BOUCHARD.